United States Patent
Fujita

[11] Patent Number: 5,862,311
[45] Date of Patent: *Jan. 19, 1999

[54] INTER-EQUIPMENT DATA LINK SYSTEM

[75] Inventor: Ryuzo Fujita, Kawasaki, Japan

[73] Assignee: Fujitsu Limited, Kanagawa, Japan

[*] Notice: This patent issued on a continued prosecution application filed under 37 CFR 1.53(d), and is subject to the twenty year patent term provisions of 35 U.S.C. 154(a)(2).

[21] Appl. No.: 619,196

[22] Filed: Mar. 21, 1996

[30] Foreign Application Priority Data

Jul. 5, 1995 [JP] Japan .................................. 7-170059

[51] Int. Cl.[6] ..................... G06F 11/00; G06F 15/163
[52] U.S. Cl. .................... 395/182.02; 395/182.09; 395/200.66; 370/223
[58] Field of Search ................ 395/182.02, 182.04, 395/182.09, 182.11, 200.17, 200.15, 200.01, 200.02, 200.05, 200.57, 200.58, 200.66, 200.68, 200.69, 200.77, 200.81; 371/20.1, 20.2, 20.5, 20.6; 370/216, 223, 224; 379/221, 273

[56] References Cited

U.S. PATENT DOCUMENTS

| | | | |
|---|---|---|---|
| 4,323,728 | 4/1982 | Bergman et al. | 178/3 |
| 4,775,976 | 10/1988 | Yokoyama | 395/182.02 |
| 5,276,445 | 1/1994 | Mita et al. | 340/825.79 |
| 5,432,715 | 7/1995 | Shigematsu et al. | 364/551.01 |

*Primary Examiner*—Dieu-Minh Le
*Attorney, Agent, or Firm*—Helfgott & Karas, P C.

[57] ABSTRACT

An inter-equipment data link system performs a data link between double equipments of an A data transmission equipment and a B data transmission equipment. In the system, a monitor output of the A data transmission equipment is supplied to the B data transmission equipment. The monitor output of the B data transmission equipment is also supplied to the A data transmission equipment. The monitor output of each of the A, B data transmission equipments includes a data frame according to a High Level Data Link Control procedure. Each of the A, B data transmission equipments includes a monitor data input decomposing unit which receives the data frames of the monitor output supplied by the other, extracts a data frame of an information type therefrom, and obtains a data portion included in an information portion in the extracted data frame as a result of decomposition.

7 Claims, 8 Drawing Sheets

FIG. 5A

| FLAG 01111110 | ADDRESS 8 BITS | CONTROL PORTION 8 BITS | INFORMATION PORTION (ANY BIT LENGTH) | FCS 16 BITS | FLAG 01111110 |

FIG. 5B

| DATA TYPE | TRANS- MISSION ADDRESS | RECEP- TION ADDRESS | PACKET NUMBER | DATA LENGTH | DATA PORTION |

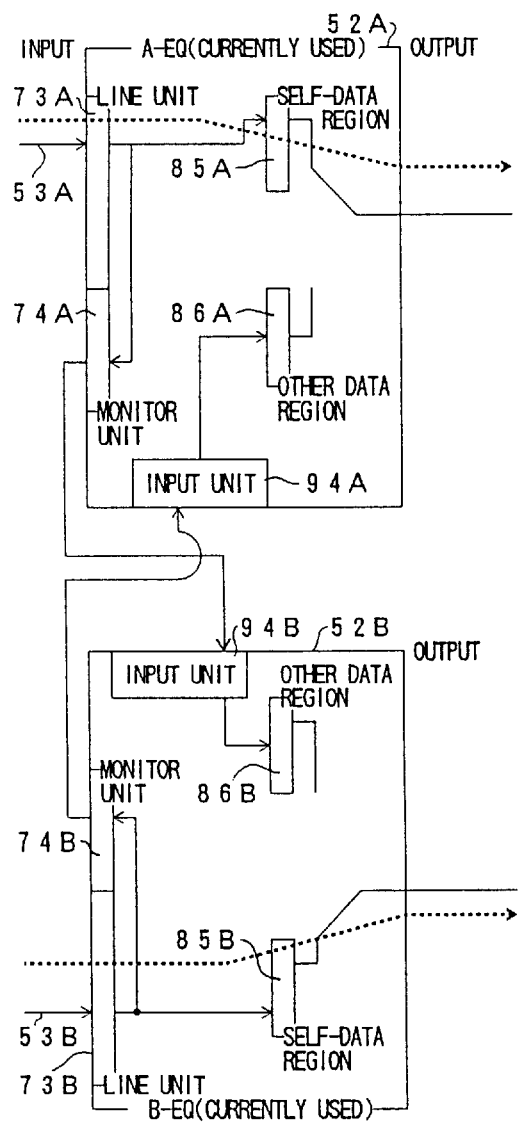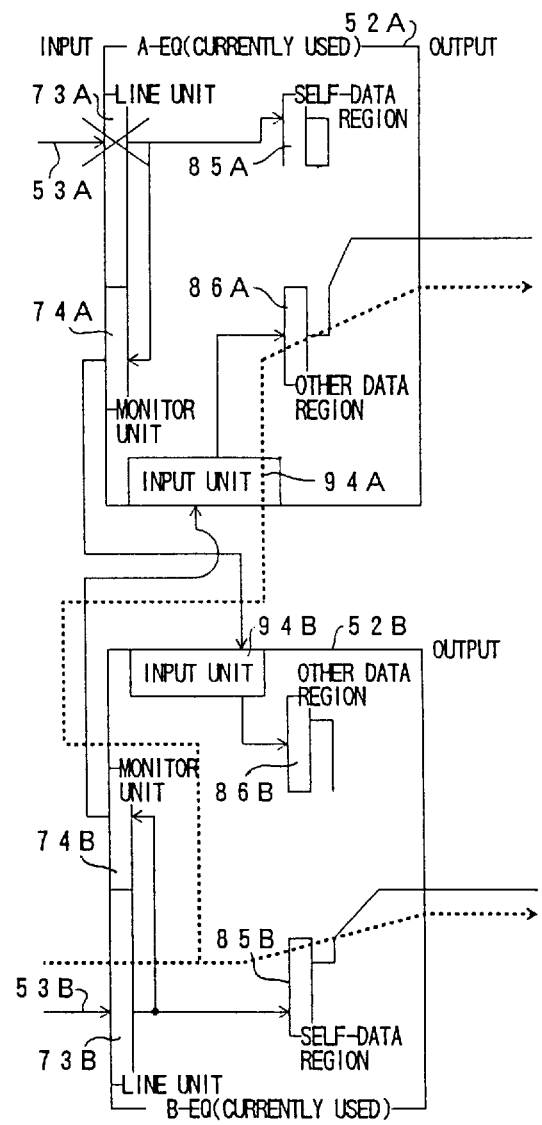

INTER-EQUIPMENT DATA LINK SYSTEM

BACKGROUND OF THE INVENTION

1. Field of the Invention

The present invention relates to an inter-equipment data link system, and in particular, to an inter-equipment system for double data transmission equipments such as those in a dual system, a duplex system or the like.

In a recent computer system, in particular, in a recent social system, it is demanded that communications be performed using a high-level data-link control (hereinafter, abbreviated as HDLC) procedure as a data transmission/reception method. Further, in order to improve system reliability, data transmission/reception is performed between double data transmission equipments. For this purpose, the double data transmission equipments should have functions of data transfer between the double equipments, which data has been received in the HDLC procedure.

2. Description of the Related Art

FIG. 1 shows a block diagram of an inter-equipment data link system in the related art. In the figure, an A data transmission equipment 10A has an arrangement the same as that of a B data transmission equipment 10B. An HDLC unit 12A in the data transmission equipment 10A performs control of the HDLC procedure and has a line unit 13A and a monitor unit 14A. The line unit 13A performs data transmission/reception between the data transmission equipment 10A and another data transmission equipment via a line 16A for the HDLC. A signal received by the line unit 13A is supplied to an HDLC driver 18A from the HDLC unit 12A, and is branched by the HDLC unit 12A and supplied to the monitor unit 14A. The monitor unit 14A outputs HDLC data for monitoring it, which data is transmitted and received through the line unit 13A. The HDLC driver 18A determines, based on the contents of a control portion of a received HDLC data frame, whether the data frame is an I frame of an information transfer type. If it is determined that the data frame is the I frame, the HDLC driver 18A reports this determination to a data reception unit 20A. The data reception unit 20A inputs therein the contents of an information portion in the I frame from the HDLC driver 18A.

The contents input in the data reception unit 20A are supplied to a data decomposition unit 22A by which only a data portion is obtained from the contents of the information portion, the data portion being stored in a self-data region 25A in a memory 24A. A special output unit 28A, a CDT transmission unit 30A and a computer output unit 32A read data stored in the self-data region 25A, convert it to special control signals, data of a CDT (Cyclic Digital Telemeter) format, and data of a format for a computer, and outputs them, respectively.

Together with the operations described above, data stored in the self-data region 25A is edited in a HDLC format in an inter-equipment editing unit 34A. The edited data is transmitted to a line 41A via an inter-equipment data transmission and reception unit 36A, an HDLC driver 38A and a line unit 41A in an HDLC unit 40A. The line unit 41A performs data transfer with a line unit 41B in the B data transmission equipment 10B via the line 42. A signal received from the B data transmission equipment 10B in the line unit 41A is input in the inter-equipment data transmission and reception unit 36A from the HDLC unit 40A via the HDLC driver 38A. An inter-equipment decomposition unit 42A extracts only the contents of an information portion in an HDLC data frame which is input in the inter-equipment data transmission and reception unit 36A, and stores the extracted data in another data region 26A in the memory 24A.

When an essential line unit such as the HDLC unit 12A or the like stops functions thereof due to some trouble or the like for example, each of the special output unit 28A, CDT transmission unit 30A and computer output unit 32A switches a data region used and thus starts reading data from the other data region 26A in the memory 24A. Thereby, the special output unit 28A, CDT transmission unit 30A and computer output unit 32A output special control signals and data of the formats, respectively, based on data received from the B data transmission equipment 10B.

In the inter-equipment data link system in the related art, as described above, the HDLC procedure is used in the inter-equipment data link, that is, the data transfer between the data transmission equipments 10A and 10B. Extra times is required for data editing by the inter-equipment editing unit 34A, 34B and for data decomposition by the inter-equipment decomposition units 42A, 42B. Therefore, as the amount of data handling increases, a delay in data processing and/or load increase in data editing and decomposition operations may occur.

Thus, an amount of data transferred between the data transmission equipments 10A and 10B forming the duplex system may increase and thereby an amount of data processing delay may increase. As a result, when the HDLC units 12A or the like stop operation due to some trouble for example and as a result a data region used is switched from the self-data region 25A to the other data region 26A, the latest data may have not yet been stored in the other data region. If such a situation occurs, non-latest data stored in the other data region 26A is read and thereby the special output unit 28A, CDT transmission unit 30A and computer output unit 32A output erroneous data.

SUMMARY OF THE INVENTION

The present invention is designed to solve the above-described problems and provide an inter-equipment data link system in which, although a transmission data amount increases, a data processing delay and a load increase can be prevented in data transfer between the double data transmission equipments.

An inter-equipment data link system, according to the present invention, for data link between double equipments of an A data transmission equipment and a B data transmission equipment, comprises:

means for supplying a monitor output of said A data transmission equipment to said B data transmission equipment; and means for supplying the monitor output of said B data transmission equipment to said A data transmission equipment.

In this system, the data link between the A, B data transmission equipments is achieved as a result of supplying the monitor output of each of the A, B data transmission equipments to the other. Thus, the transmission data supplied does not undergo any data conversion when being supplied to the other data transmission equipment. Thereby, no time delay occurs and also no work load increase occurs when the data link is performed.

It may be that the monitor output of each of said A, B data transmission equipments comprises a data frame according to a High Level Data Link Control (HDLC) procedure. In this system, each of the A, B data transmission equipments supplies the monitor output which includes data frames according to the HDLC procedure.

Further, it may be that each of said A, B data transmission equipments comprises monitor data input decomposing means which receives the data frames of the monitor output supplied by the other, extracts a data frame of an information type therefrom, obtains a data portion included in a information portion in the extracted data frame as a result of decomposition. Thereby, in each of the A, B data transmission equipments, no time delay occurs when the transmission data received via the line is input via the other data transmission equipment, and no work load for performing an editing operation for achieving the inter-equipment data link is to be borne.

It may be that said A, B data transmission equipments form a dual system, to each of which the same transmission data is supplied via a separate line. In this system, there is no time delay in processing data and no increase of work load for achieving the inter-equipment data link even if an amount of data to be handled increases. Accordingly, a switching operation performed when one of the double equipment malfunctions in the dual system can be performed in high speed and system reliability can be improved.

It may be that said A, B data transmission equipments form a duplex system, to each of which the same transmission data is supplied via the same line, and in which either of said A, B data transmission equipments is currently used and the other is a standby. In this system, there is no time delay in processing data and no increase of work load for the inter-equipment data link even if an amount of data to be handled increases. Accordingly, a switching operation performed when the one of the double equipments malfunctions in the duplex system can be performed in high speed and without data flow break. Thus, system reliability can be improved.

It may be that each of said A, B data transmission equipments comprises switching control means, by which, when a data reception unit receiving the transmission data via said line malfunctions, the transmission data to be output by the data transmission equipment is switched, and thereby the transmission data of the monitor output supplied by the other data transmission equipment is output instead of the transmission data input through said data reception unit. In this system, when either one of the A, B data transmission equipments malfunctions, the switching control means automatically switches, the data to be output, into the monitor output supplied by the other data transmission equipment. Thereby, the dual system has a high reliability.

It may be that each of said A, B data transmission equipments comprises switching control means, by which, when a data reception unit receiving the transmission data via said line malfunctions in the data transmission equipment currently being used, a switching operation is performed such that said data transmission equipment currently being used becomes a standby and the other data transmission equipment becomes currently used. Thereby, the duplex system has a high reliability.

Other objects and further features of the present invention will become more apparent from the following detailed description when read in conjunction with the accompanying drawings.

BRIEF DESCRIPTION OF THE DRAWINGS

FIG. 5A shows a HDLC data frame format;

FIG. 5B shows a data format of an information portion of an I frame;

FIGS. 6A and 6B illustrate operations in the system shown in FIG. 2;

DETAILED DESCRIPTION OF PREFERRED EMBODIMENTS

Figure 1:
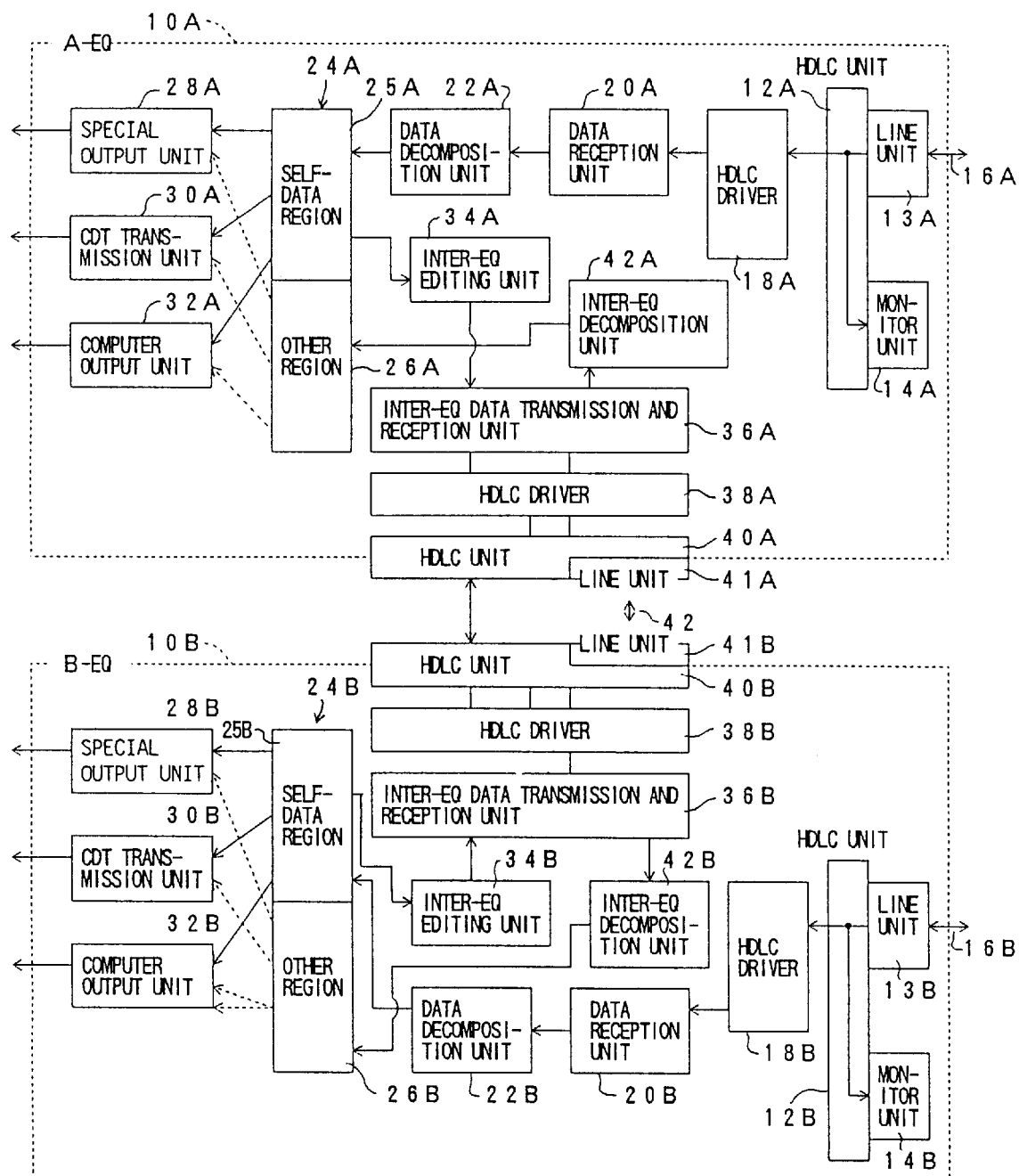
FIG. 1 shows a block diagram of an inter-equipment data link system in the related art.
Figure 2:
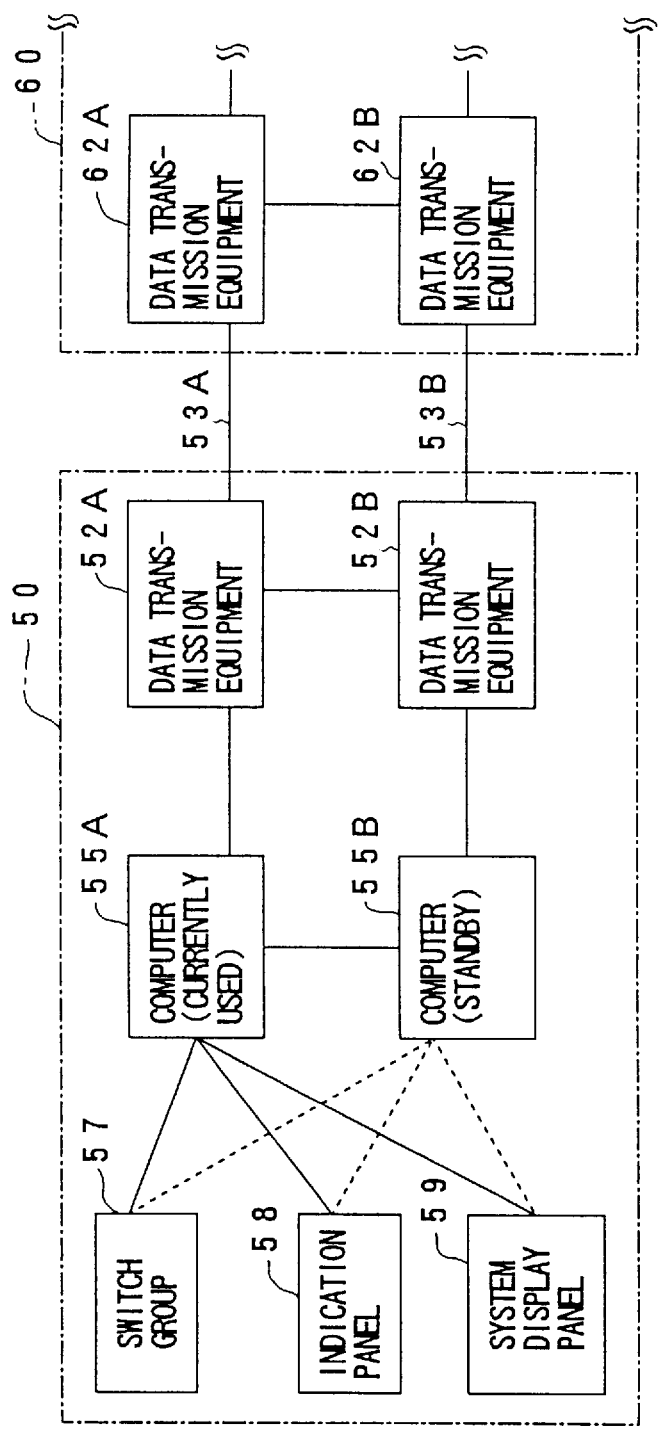
FIG. 2 shows a block diagram of a dual system to which an inter-equipment data link system in a first embodiment of the present invention is applied.

FIG. 2 shows a block diagram of a dual system for electric-power-supply (or feeding) information transmission, to which system an inter-equipment data link system in a first embodiment of the present invention is applied. In the figure, A, B data transmission equipments 52A, 52B (which may be referred to simply as A, B equipments, respectively, hereinafter) are provided in a first station 50 in which a head office or the like is located, for example. Other A, B data transmission equipments 62A, 62B are provided in a second station 60 in which a power generating station or a substation is located, for example. A line 53A for HDLC is used to connect between the data transmission equipments 52A and 62A, and data transmission according to the HDLC procedure is performed therebetween through the line 53A. Similarly, a line 53B for HDLC is used to connect between the data transmission equipments 52B and 62B, and data transmission according to the HDLC procedure is performed therebetween through the line 53B. Inter-equipment connection is performed between the A, B data transmission equipments 52A, 52B in the first station 50, and also inter-equipment connection is performed between the A, B data transmission equipments 62A, 62B in the second station 60. In the dual system, each of the A, B equipments 52A, 52B is currently used in an ordinary condition.

In the first station 50, computer-format data which is output by each of the A, B data transmission equipments 52A, 52B is supplied to the respective one of computers 55A, 55B. The computer 55A is connected with the computer 55B, and each of the computers 55A and 55B compares data and calculation results provided by the other. For example, it is preset that the computer 55A is a currently used one and the computer 55B is a standby one. If it is determined, according to a result of the above-mentioned mutual comparison of the data and calculation results, that the currently used computer 55A malfunctions, a currently used computer is switched to the original standby computer 55B.

The currently used computer 55A supplies special control signals to switch group 57 and performs switching control of switches included in the switch group 57. In the switching control, electric-power-supply paths or the like are switched. An indication panel 58 is used, under control of the computer 55A, for indicating a connection state of each switch of the switches included in the switch group 57. A system display panel 59 is used, under control of the computer 55A, for displaying switching states of electric-power-supply paths, supply powers and voltages at electric-power-supply points, and so forth. As long as the computer 55A currently being used operates normally, the computer 55A uses the data supplied by the A equipment 52A and thereby controls the switch group 57, indication panel 58 and system display panel 59. Accordingly, although the B equipment 52B is also operating in parallel with the A equipment 52A as mentioned above so as to enable the two computers 55A, 55B comparing the data and calculation results with each other, it may be said that the B equipment is a standby one in this view point. If the currently used computer is switched to the other computer 55B, the computer 55B, instead of the computer 55A, performs these operations.

Figure 3:
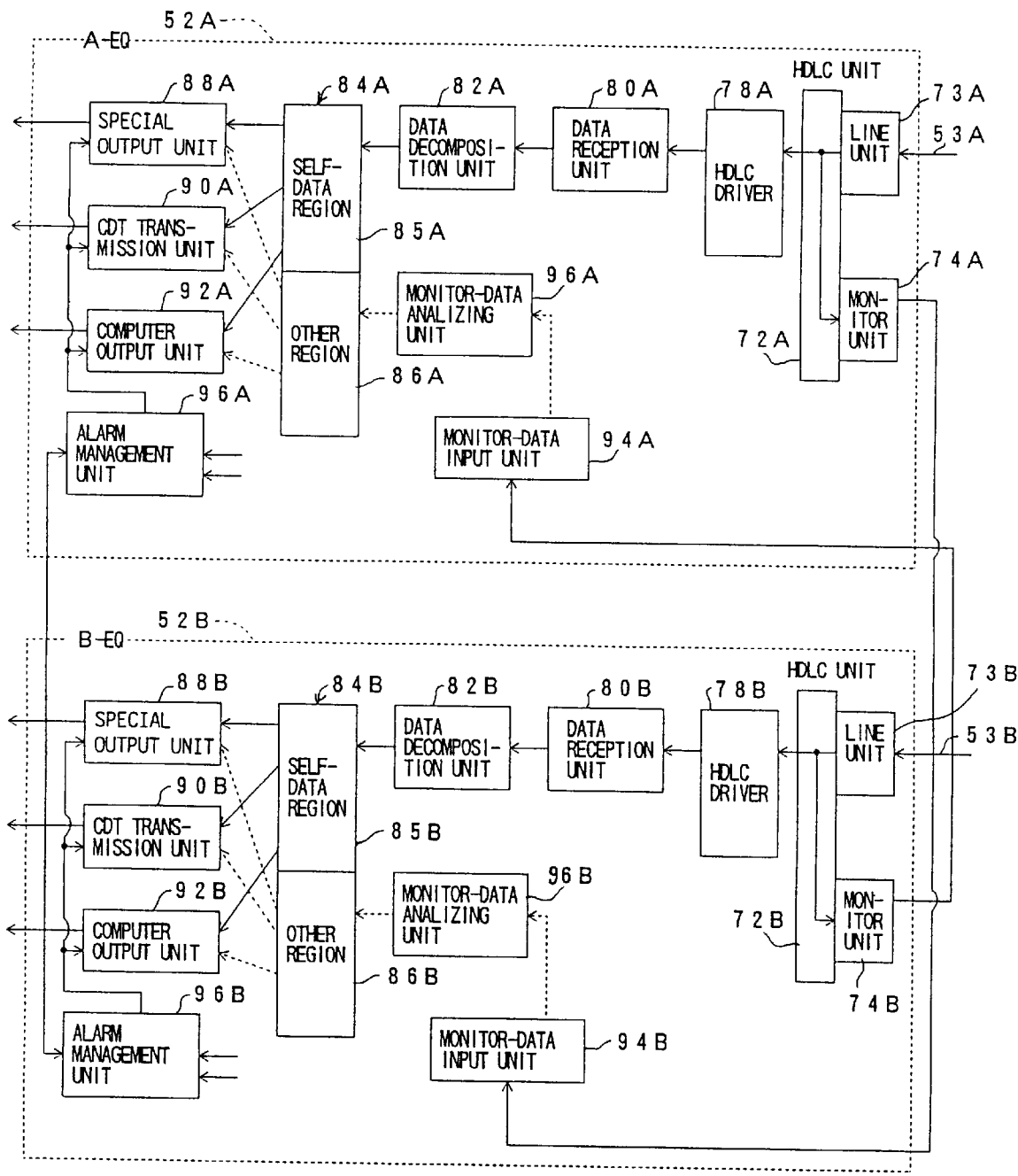
FIG. 3 shows a block diagram of the inter-equipment data link system in the first embodiment of the present invention.

FIG. 3 shows a block diagram of the inter-equipment data link system in the first embodiment of the present invention. The A, B data transmission equipments 52A, 52B are those shown in FIG. 2, provided in the first station. In FIG. 3, an HDLC unit 72A in the above-mentioned A data transmission equipment 52A performs control of the HDLC procedure and has a line unit 73A and a monitor unit 74A. The line unit 73A performs data transmission/reception between the A data transmission equipment 52A and the other A data transmission equipment 62A in the second station 60 via the line 53A for the HDLC. A signal received by the line unit 73A is supplied to an HDLC driver 78A from the HDLC unit 72A, and is branched by the HDLC unit 72A and supplied to the monitor unit 74A. The monitor unit 74A outputs HDLC data for monitoring it, which data is transmitted and received through the line unit 73A. The HDLC driver 78A determines, based on the contents of a control portion of a received HDLC data frame, whether the data frame is an I frame of the information transfer type. If it is determined that the data frame is the I frame, the HDLC driver 78A reports this determination to a data reception unit 80A. The data reception unit 80A inputs therein the contents of an information portion in the I frame from the HDLC driver 78A.

The contents input in the data reception unit 80A are supplied to a data decomposition unit 82A, by which only a data portion is obtained from the contents of the information portion, the data portion being stored in a self-data region 85A in a memory 84A.

A monitor data input unit 94A is connected with a monitor unit 74B in the B data transmission equipment 52B. When monitor data, that is HDLC data is output by the monitor unit 74B, the monitor data input unit 94A inputs therein the contents of an information portion in an I frame of an HDLC data frame of the supplied HDLC data. The contents of the information portion is supplied to a monitor data decomposition unit 96A, and only a data portion in the contents of the information portion is stored in another data region 86A of the memory 84A. The monitor data input unit 94A and monitor data decomposition unit 96A act as monitor data input decomposing means.

A special output unit 88A, a CDT transmission unit 90A and a computer output unit 92A read data stored in the self-data region 85A or the other data region 86A, convert it to special switching control signals, data of a CDT (Cyclic Digital Telemeter) format, and data of a computer format, and outputs them, respectively. The data of the format for computer which is output by the computer output unit 92A is supplied to the computer 55A shown in FIG. 2. If a station in which the data transmission equipment is located is a station such as a branch office in which no computer is provided, the special switching control signals output by the special output unit 88A are supplied to the switch group 57, and the data output by the CDT transmission unit 90A is supplied to a CDT reception device (not shown in the figure) and output of the CDT reception device is supplied to the indication panel 58.

An alarm management unit 96A acting as switching control means monitors the HDLC unit 72A, line unit 73A and HDLC driver 78A acting as an input and output unit in the data transmission equipment 52A. If these units malfunction and thereby an alarm signal is supplied from the units, the alarm management unit 96A outputs instructions for each of the special output unit 88A, CDT transmission unit 90A and computer output unit 92A to switch a data region used, from the self-data region 85A to the other data region 86A, and read data from the other data region 86A. Further, the alarm management unit 96A reports the above-mentioned switching operation to an alarm management unit 96B in the B data transmission equipment 52B.

In FIG. 3, an HDLC unit 72B in the above-mentioned B data transmission equipment 52B performs control of the HDLC procedure and has a line unit 73B and a monitor unit 74B. The line unit 73B performs data transmission/reception between the B data transmission equipment 52B and the other B data transmission equipment 62B in the second station 60 via the line 53B for the HDLC. A signal received by the line unit 73B is supplied to an HDLC driver 78B from the HDLC unit 72B, and is branched by the HDLC unit 72B and supplied to the monitor unit 74B. The monitor unit 74B outputs HDLC data for monitoring it, which data is transmitted and received through the line unit 73B. The HDLC driver 78B determines, based on the contents of a control portion of a received HDLC data frame, whether the data frame is an I frame of the information transfer type. If it is determined that the data frame is the I frame, the HDLC driver 78B reports this determination to a data reception unit 80B. The data reception unit 80B inputs therein the contents of an information portion in the I frame from the HDLC driver 78B.

The contents which are input in the data reception unit 80B are supplied to a data decomposition unit 82B, by which only a data portion is obtained from the contents of the information portion, the data portion being stored in a self-data region 85B of a memory 84B.

A monitor data input unit 94B is connected with a monitor unit 74A in the A data transmission equipment 52A. When monitor data, that is HDLC data is output by the monitor unit 74A, the monitor data input unit 94B inputs therein the contents of an information portion in an I frame of an HDLC data frame of the supplied HDLC data. The contents of the information portion is supplied to a monitor data decomposition unit 96B, and only a data portion in the contents of the information portion is stored in another data region 86B of the memory 84B. The monitor data input unit 94B and monitor data decomposition unit 96B act as the monitor data input decomposing means.

A special output unit 88B, a CDT transmission unit 90B and a computer output unit 92B read data stored in the self-data region 85B or the other data region 86B, convert it to special switching control signals, data of a CDT (Cyclic Digital Telemeter) format, and data of a computer format, and outputs them, respectively. The data of the format for computer which is output by the computer output unit 92B is supplied to the computer 55B shown in FIG. 2. If a station in which the data transmission equipment is located is a station such as a branch office in which no computer is provided, the special switching control signals output by the special output unit 88B are supplied to the switch group 57, and the data output by the CDT transmission unit 90B is supplied to a CDT reception device (not shown in the figure) and output of the CDT reception device is supplied to the indication panel 58.

An alarm management unit 96A acting as the switching control means monitors the HDLC unit 72B, line unit 73B and HDLC driver 78B acting as the input and output unit in the data transmission equipment 52B. If these units malfunction and thereby an alarm signal is supplied from the units, the alarm management unit 96B outputs instructions for each of the special output unit 88B, CDT transmission unit 90B and computer output unit 92B to switch a data region used, from the self-data region 85B to the other data region 86B, and read data from the other data region 86B. Further, the alarm management unit 96B reports the above-mentioned switching operation to the alarm management unit 96A in the A data transmission equipment 52A.

As described above, in the first embodiment of the present invention, different from the system in the related art, the HDLC transmission is not performed for the inter-equipment data link between the A, B transmission equipments 52A and 52B. Instead, the monitor output of each equipment is supplied to the other equipment.

Figure 4:
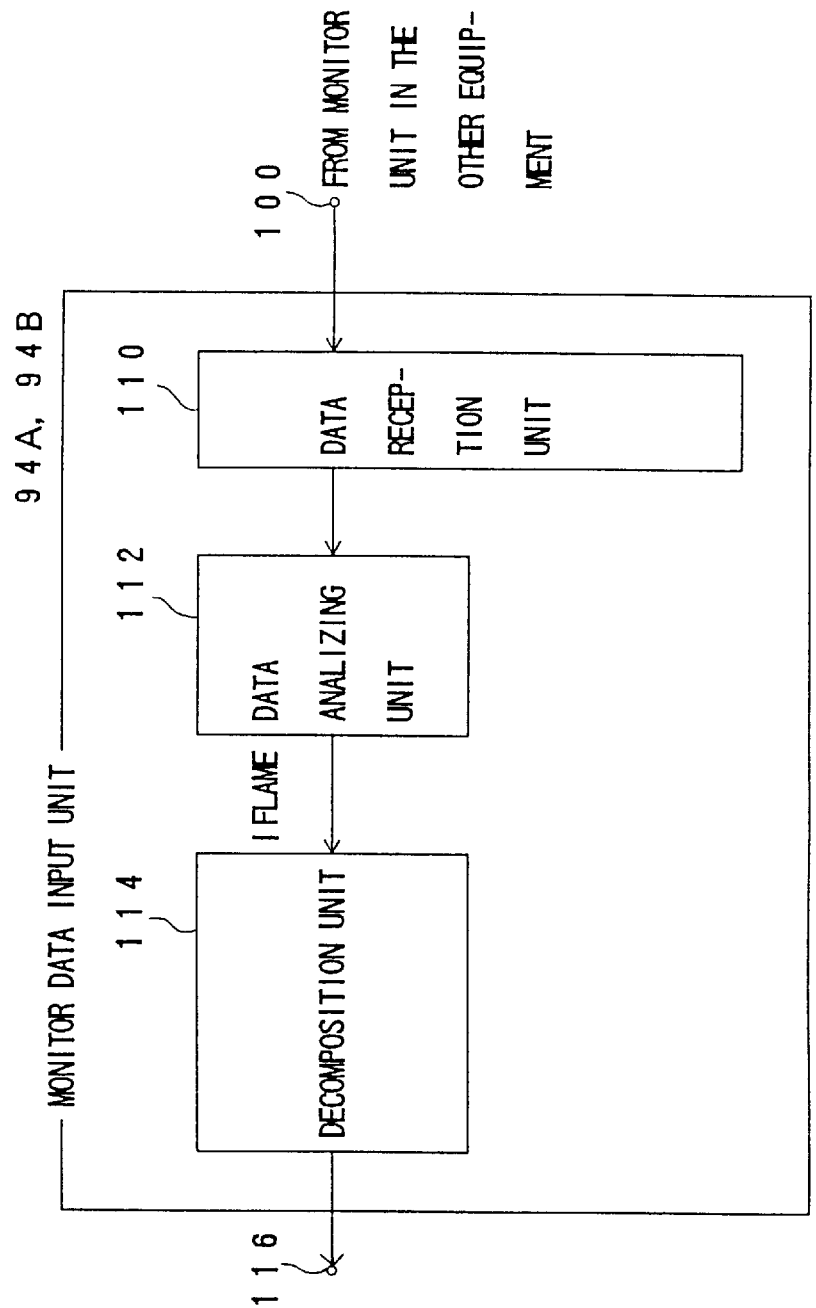
FIG. 4 shows a block diagram of an monitor data input unit shown in FIG. 3.

FIG. 4 shows a block diagram of each of the above-described monitor data input units 94A and 94B. In the figure, in a terminal 100, the monitor output is supplied by the monitor unit 74A or 74B of the other equipment. The monitor output is a signal in the HDLC format such as that shown in FIGS. 5A and 5B.

FIG. 5A shows a format of the HDLC data frame. In the format, the top 8 bits are flag and have a fixed pattern of "01111110". The subsequent 8 bits are an address and represent an address given to a station which transmits and receives the frame. The next subsequent 8 bits are the control portion and represent a type of the frame, specifically, whether the type of the frame is the information type (I frame), a supervisory type (S frame) or an unnumbered type (U frame). Further, the 8 bits of the control portion represent a command and a response. A subsequent portion is the information portion and has any bit length. A subsequent 16 bits are a frame check sequence (FCS) and include CRC data for transmission error detection. The last 8 bits are a flag and have a fixed pattern of "01111110".

FIG. 5B shows a format of the I frame. As shown in the figure, the I frame includes, in order from the top, a data type, a transmission address, a reception address, a packet number, a data length and the data portion.

With reference back to FIG. 4, the data frame of the monitor output input via the terminal 100 is received by a data reception unit 110 and supplied to a data analyzing unit 112. The data analyzing unit 112 examines an information type of the received data frame using the 8 bits of the control portion shown in FIG. 5A for each data frame. Thereby, the data analyzing unit 112 extracts only the I frame and supplies it to a decomposition unit 114. Data frames of the other types such as an S frame and a U frame are discarded. The decomposition unit 114 obtains only the information portion, shown in FIG. 5A, from the I frame supplied and outputs it via a terminal 116.

The information portion in the I frame is supplied to the monitor data decomposition unit 96A or 96B shown in FIG. 3, and the data decomposition unit obtains the data portion shown in FIG. 5B from the information portion, the data portion being stored in the other data region 86A or 86B. Where the data portion is to be stored in the other data region 86A or 86B is determined based on the contents of the data type, transmission address, reception address and packet number of the information portion shown in FIG. 5B.

In the above-described dual system, in the ordinary condition, each of the A, B data transmission equipments 52A, 52B operates in a normal condition together. In the ordinary condition, as shown in FIG. 6A, data received via the line 53A for HDLC in the A equipment is output along a path shown in a broken line through the line unit 73A and self-data region 85A. Further, data received via the line 53B for HDLC in the B equipment is output along a path shown in a broken line through the line unit 73B and self-data region 85B. Also in this condition, the monitor output of the monitor unit 74B in the B equipment is sent to the other region 86A from the monitor data input unit 94A in the A equipment and is stored in the other region 86A. Further, the monitor output of the monitor unit 74B in the A equipment is sent to the other region 86B from the monitor data input unit 94B in the B equipment and is stored in the other region 86B.

If, for example, the line unit 73A in the A equipment malfunctions, the data supplied to the monitor data input unit 94A from the monitor unit 74B in the B equipment and stored in the other data region 86A is output along a path indicated by a broken line as shown in FIG. 6B in the A equipment under control by the alarm management unit 96A. In the B equipment, the data received via the line 53B is output via the line unit 73B and the self-data region 85B along a path indicated by a broken line in FIG. 6B.

As described above, the A, B data transmission equipments 52A, 52B supply the monitor outputs which are the data frames according to the HDLC procedure, and receive the data frames of the monitor outputs, respectively. The equipments 52A, 52B extract the data frames of the information type from the received data frames, and obtain the data portions included in the information portions in the extracted data frames, respectively. As a result, in each of the A, B data transmission equipments 52A, 52B, there is no time delay in processing data when receiving the monitor output supplied by the other equipment. Also, no load of an editing operation for performing inter-equipment data link is required to be borne.

Thus, there is no time delay in processing data and no increase of work load for the inter-equipment data link even if an amount of data to be handled increases. Accordingly, a switching operation performed when one of the double equipments malfunctions in the dual system can be performed in high speed, and also system reliability can be improved. The switching operation is such as described with reference to FIGS. 6A and 6B.

Figure 7:
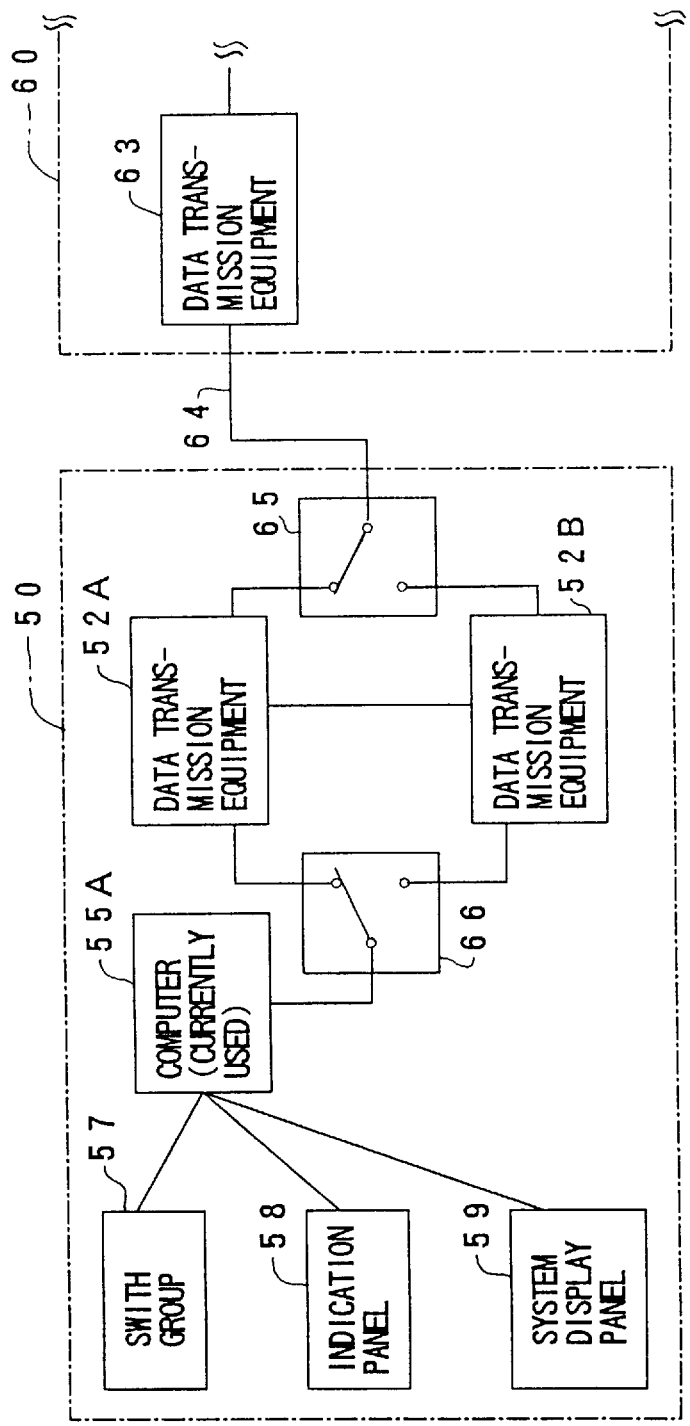
FIG. 7 shows a block diagram of a duplex system to which an inter-equipment data link system in a second embodiment of the present invention is applied.

FIG. 7 shows a block diagram of a duplex system for electric-power-supply (or feeding) information transmission, to which system an inter-equipment data link system in a second embodiment of the present invention is applied. In FIG. 7, reference numerals the same as those given to units shown in FIG. 2 are given to the same units.

In FIG. 7, the A, B data transmission equipments 52A, 52B are provided in the first station 50 in which a head office or the like is located, for example. Another data transmission equipment 63 is provided in the second station 60 in which a power generating station or a substation is located, for example. A line 64 for HDLC is used to connect between the first and second stations 50 and 60, and data transmission according to the HDLC procedure is performed therebetween. Inter-equipment connection is performed between the A, B data transmission equipments 52A, 52B in the first station 50, and it is preset that the A equipment is a currently used one and the B equipment is a standby one for example.

The line 64 is connected to a switch 65 in the first station 50, and the switch 65 is used for switching a connecting equipment between the A, B equipments 52A, 52B. Further, the data of the format for computer output by the A, B equipments 52A, 52B is supplied to another switch 66, and the switch 66 is used for switching data to be supplied to the computer 55A between the data supplied by the A, B equipments 52A, 52B. The switching operation of each of the switches 65 and 66 is controlled by the alarm management units 96A and 96B, which are provided in the A, B equipments 52A, 52B, respectively.

In the first station 50, the computer 55A supplies the special control signals to switch group 57 and performs switching control of switches included in the switch group 57. In the switching control, electric-power-supply paths or the like are switched. The indication panel 58 is used, under control of the computer 55A, for indicating a connection state of each switch of the switches included in the switch group 57. The system display panel 59 is used, under control of the computer 55A, for displaying switching states of electric-power-supply paths, supply powers and voltages at electric-power-supply points, and so forth.

Figure 8A:
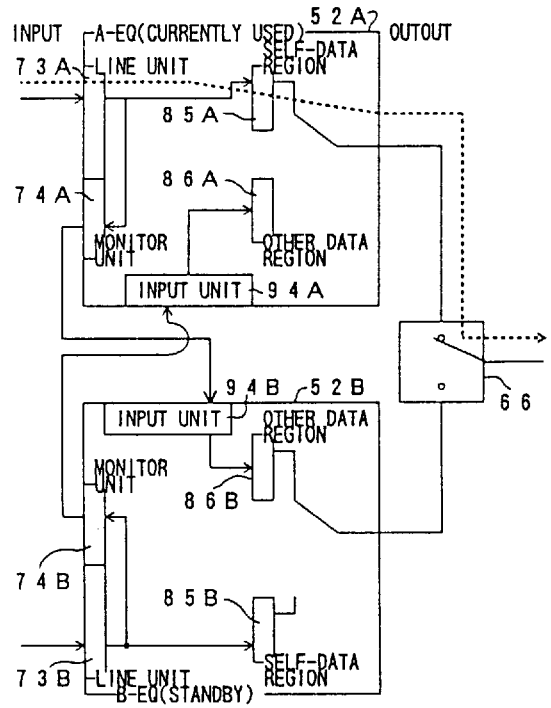
FIGS. 8A, 8B and 8C illustrate operations in the system shown in FIG. 7.

In the above-described duplex system, in an ordinary condition in which the A data transmission equipment 52A operates in a normal condition as a currently used equipment, the data received from the line 64 for HDLC is transferred along a path indicated by a broken line through the line unit 73A and self-data region 85A and output from the switch 66 as shown in FIG. 8A. At this time, the monitor output of the monitor unit 74A in the A equipment is supplied to the B data transmission equipment 52B, received through the monitor data input unit 94B, and stored in the other data region 86B.

Figure 8B:
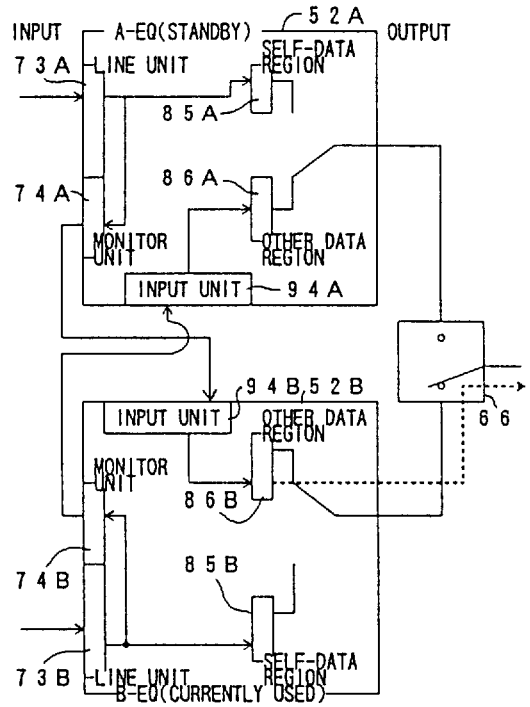

For example, if the circuit unit 73A in the A equipment malfunctions, the switches 65 and 66 (as shown in FIG. 8B) are switched thereby to turn to the B data transmission equipment 52B, respectively, under control by the alarm management unit 96A, acting as switching control means, in the A equipment. Thereby, the data stored in the other data region 86B in the data transmission equipment 52B is output through the switch 66 along a path indicated by a broken line as shown in FIG. 8B.

Figure 8C:
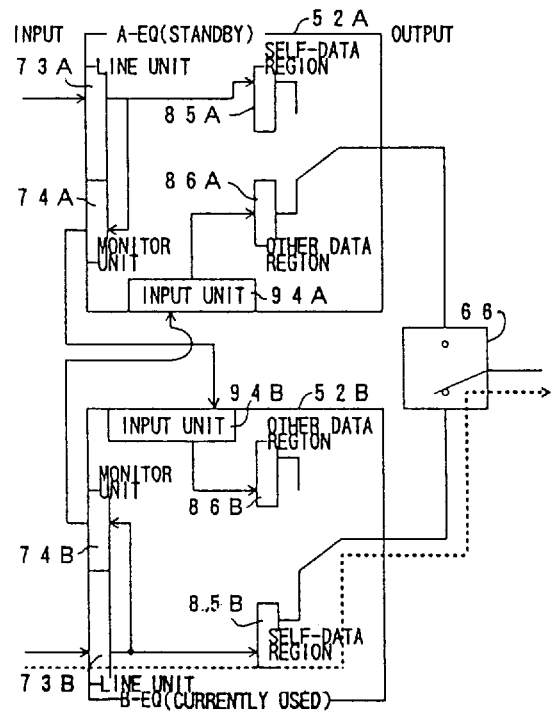

Further, as a result of the above-mentioned switching operation of the switch 65, the data is supplied to the B data transmission equipment 52B from the data transmission equipment 63 in the second station 60 via the line 64. This data is, as shown in FIG. 8C, transferred through the line unit 73B and the self-data region 85B, and output through the switch 66, along a path indicated by a broken line. Thus, the B data transmission equipment 52B is the currently used equipment, and the A data transmission equipment 52A is the standby equipment.

Thus, there is no time delay in processing data and no increase of a work load for the inter-equipment data link even if an amount of data to be handled increases. Accordingly, a switching operation performed when the one of the double equipments malfunctions in the duplex system can be performed in high speed and without data flow break. Thus, system reliability can be improved. The switching operation is such that described with reference to FIGS. 8A, 8B and 8C.

The present invention is not limited to the above-described embodiments, and variations and modifications may be made without departing from the scope of the present invention.

What is claimed is:

1. An inter-equipment data link system for providing a data link between double equipments of an A data transmission equipment and a B data transmission equipment, comprising:

each of said A,B data transmission equipments includes monitor data input decomposing means for receiving data frames of monitor output supplied by the other of said A,B data transmission equipments, extracts a data frame of an information type therefrom, and obtains a data portion included in an information portion in the extracted data frame as a result of decomposition;

means for supplying data from a monitor output of said A data transmission equipment directly to said monitor data input decomposing means of said B data transmission equipment without first processing the data within a HDLC driver of said A data transmission equipment; and means for supplying data from the monitor output of said B data transmission equipment directly to said monitor data input decomposing means of said A data transmission equipment without first processing the data within a HDLC driver of said B data transmission equipment.

2. The inter-equipment data link system according to claim 1, wherein the monitor output of each of said A, B data transmission equipments comprises a data frame according to a High Level Data Link Control procedure.

3. The inter-equipment data link system according to claim 1, wherein said A, B data transmission equipments form a dual system, to each of which same transmission data is supplied via a separate line.

4. The inter-equipment data link system according to claim 3, wherein each of said A, B data transmission equipments comprises switching control means, by which, when a data reception unit receiving the transmission data via said line malfunctions, the transmission data to be output by the data transmission equipment is switched, and thereby the transmission data of the monitor output supplied by the other data transmission equipment is output instead of the transmission data input through said data reception unit.

5. The inter-equipment data link system according to claim 1, wherein said A, B data transmission equipments form a duplex system, to each of which same transmission data is supplied via a same line, and in which one of said A, B data transmission equipments is currently used and the other of said A, B data transmission equipments is a standby.

6. The inter-equipment data link system according to claim 5, wherein each of said A, B data transmission equipments comprises switching control means, by which, when a data reception unit receiving the transmission data via said line malfunctions in the data transmission equipment currently being used, a switching operation is performed such that said data transmission equipment currently being used becomes a standby and the other data transmission equipment becomes currently used.

7. A data transmission system comprising double data transmission equipment, each one of said double data transmission equipments, comprising:

monitor means which outputs transmission data directly to one of the data transmission equipments without first processing the transmission data within a HDLC driver of another of the data transmission equipments, the output data being used for monitoring the transmission data; and monitor data input decomposing means which receives data frames of the transmission data supplied by said monitor means of the another of the data transmission equipments, extracts a data frame of an information type therefrom, and obtains a data portion included in an information portion in the extracted data frame as a result of decomposition.

* * * * *